L. H. WHEELER, Dec'd,
H. W. WHEELER, Executrix.
Pump.
No. 8,827. Reissued July 29, 1879.
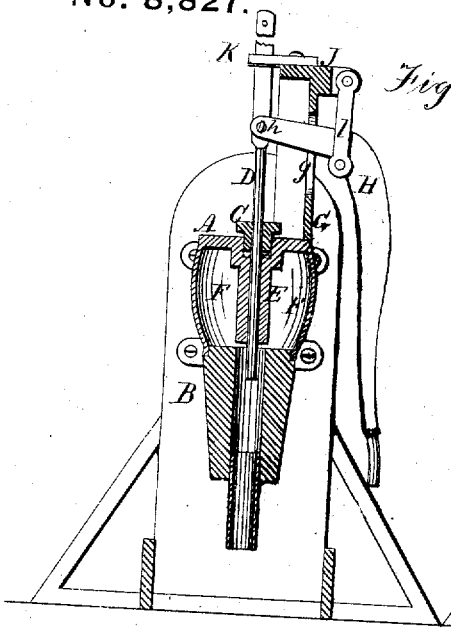
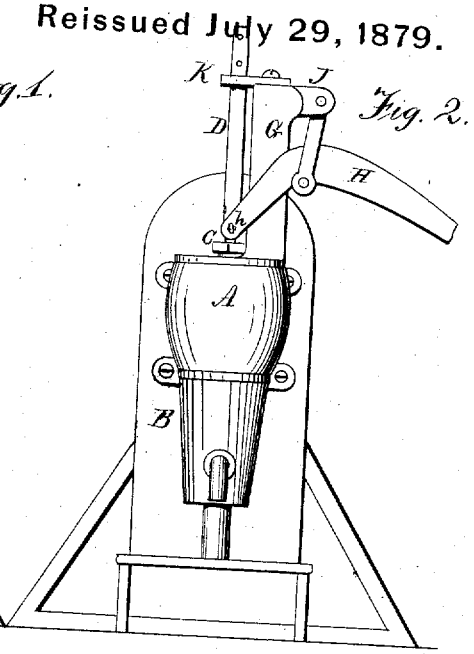
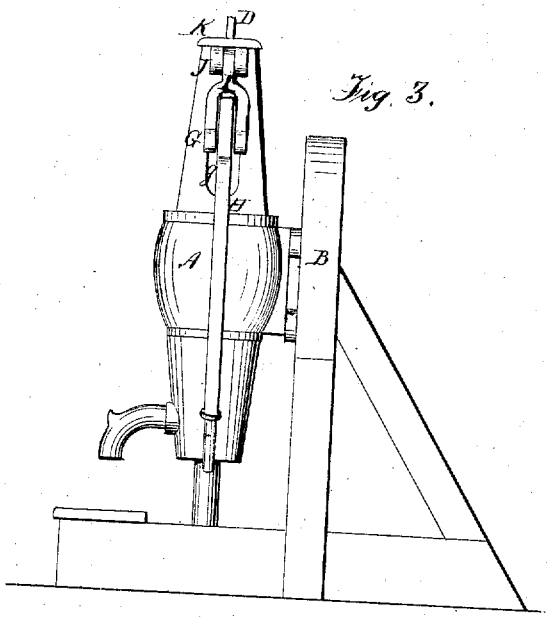
Witnesses;
Granville Lewis
M. Church
Inventor.
Harriet W. Wheeler,
Executrix of the Estate of L. H. Wheeler, Deceased.
By L. Hice,
Her Atty.
THE NORRIS PETERS CO., PHOTO-LITHO., WASHINGTON, D. C.

UNITED STATES PATENT OFFICE.

HARRIET W. WHEELER, (EXECUTRIX OF LEONARD H. WHEELER, DECEASED,) OF BELOIT, WISCONSIN.

IMPROVEMENT IN PUMPS.

Specification forming part of Letters Patent No. 156,612, dated November 3, 1874; Reissue No. 8,827, dated July 29, 1879; application filed March 11, 1879.

*To all whom it may concern:*

Be it known that LEONARD H. WHEELER, late of Beloit, in the county of Rock and State of Wisconsin, did during his lifetime invent a new and useful Improvement in Pumps, of which the following is a specification.

In that class of pumps in which the piston-rod is operated either by a pump-handle or by a wind-wheel serious difficulties have heretofore arisen when the latter motive power has been employed, in view of the fact that the swivel-joint ordinarily employed for preventing the rotary movement of the piston-rod, which arises from the varying position of the wind-wheel, may become so inoperative from friction as to unscrew the piston-rod of the pump.

The object of this invention is to obviate this defect, and at the same time to prevent entirely any lateral movement of the piston-rod, which secures a direct vertical movement of the latter; and to these ends the invention consists in the combination of a pump-plunger rod guided above the top of the pump to prevent lateral swaying, further guided to prevent the rotary or unscrewing movement above referred to, and having means for attaching the working-rod of a windmill to its upper end, with a detachable pump-handle mounted on an oscillating fulcrum, so as to accommodate itself to the true vertical movement of the plunger-rod, as will be hereinafter set forth.

In the accompanying drawings, Figure 1 is a vertical section; Fig. 2, a front elevation; and Fig. 3, a side elevation.

Similar letters of reference in the several figures denote the same parts.

A represents the pump-head of a pump, securely attached to a supporting-frame, B, from one side of which pump-head a standard, G, rises, having a slot, *g*, through which the shorter arm of a bell-crank-shaped pump-handle, H, passes. The handle H is hung between the arms of the link I, which swings freely in the line of motion of the pump-handle, and which is suspended from a projection, J, extending outwardly from the top of the standard G. The end of the shorter arm of the handle H is made to embrace the piston-rod D, and is attached to the same by means of a pin, *h*, in such a manner that the length of the stroke of the piston-rod may be regulated by attaching the handle higher or lower on the rod, and that the handle may be entirely detached from the piston-rod, if desired. The upper end of the piston-rod D is flattened or made rectangular or square in cross-section, and fits into a correspondingly-formed stationary guide, K, attached to the standard G.

By this construction it will be seen that all lateral movement of the piston-rod and windmill attachment is prevented, while all rotary motion of the piston-rod is prevented by the engagement of the flattened upper end of the piston-rod with the similarly-formed stationary guide. The flattened form of the upper end of the piston-rod also enables the bifurcated end of the pump-handle to be more readily attached to the piston-rod.

The operation of the suspended pump-handle when not used with wind-power is as follows: When the free arm of the handle H is lifted the smaller inner arm is depressed, and the link I swings forward of its vertical line. On depressing the handle the inner arm is thrown upwardly, raising the piston-rod, and the link swings outwardly until about one-half of the stroke of the piston is made, when, to finish this stroke, the link again swings inwardly. In each complete up-and-down stroke of the piston-rod the suspended link makes two motions forward and backward. These motions are the same as would have to be made by the piston-rod were the pivot of the handle a fixed one, in which case the motion of the piston-rod would not be a strictly vertical one, and thus guides could not be applied; but, as a guide is necessary to enable the piston-rod to be operated by wind-power, and must necessarily be so high that it would be more than inconvenient to remove or replace the guide in changing from wind to hand power, and vice versa, the arrangement of the pump-handle in the swinging link obviates all difficulties.

In many cases it is imperatively necessary to have the pump-head tightly closed to prevent dirt from entering the pump. In that case the piston-rod works in an opening in the pump-head only sufficiently large to allow the free passage of the piston-rod, but no lateral movement of the same; and in this case the piston-rod would have to be provided with a portion having a lateral motion were the handle pivoted at a fixed point, and then some provision would have to be made to make the piston-rod rigid in its entire length to enable wind-power to be applied.

The arrangement of the swinging handle and swinging links covers all the points in a simple and effective way.

In the drawings the pump-head is shown as made close at the top by means of a stuffing-box, C, through which the piston-rod D passes. From the top of the pump-head extends downwardly and inwardly a tube, E, surrounding the piston-rod, and leaving an air-space, F, between the walls of the pump-head and the tube E. This construction is shown as an example where the piston-rod cannot have lateral motion; but it forms no part of the invention, for the invention can be applied to all forms and kinds of pumps with advantage.

It is well known that pump-rods guided to prevent lateral swaying have been heretofore combined with a handle mounted on an oscillating fulcrum; but such rods were not provided with means for attaching the working-rod of a windmill to their upper end, nor with guides to prevent rotation around their vertical axes, and therefore they were not adapted to be employed both for use in connection with windmills and by hand, as is the pump hereinabove described. They are not claimed as the invention of said LEONARD H. WHEELER; but

What is claimed as his invention is—

The combination of a pump-rod, D, guided to prevent lateral and rotary movement, and having means for the attachment of the working-rod of a windmill to its upper end, with a detachable pump-handle mounted on an oscillating fulcrum, substantially as and for the purpose described.

HARRIET W. WHEELER,
*Executrix of the estate of Leonard H. Wheeler, deceased.*

Witnesses:
E. S. GREENE,
G. F. WHEELER.